June 16, 1959   H. K. BUSECRUS   2,890,647
ROLLER MILL BEARING
Filed Sept. 10, 1954   6 Sheets-Sheet 1

Inventor:

June 16, 1959   H. K. BUSECRUS   2,890,647
ROLLER MILL BEARING

Filed Sept. 10, 1954   6 Sheets-Sheet 4

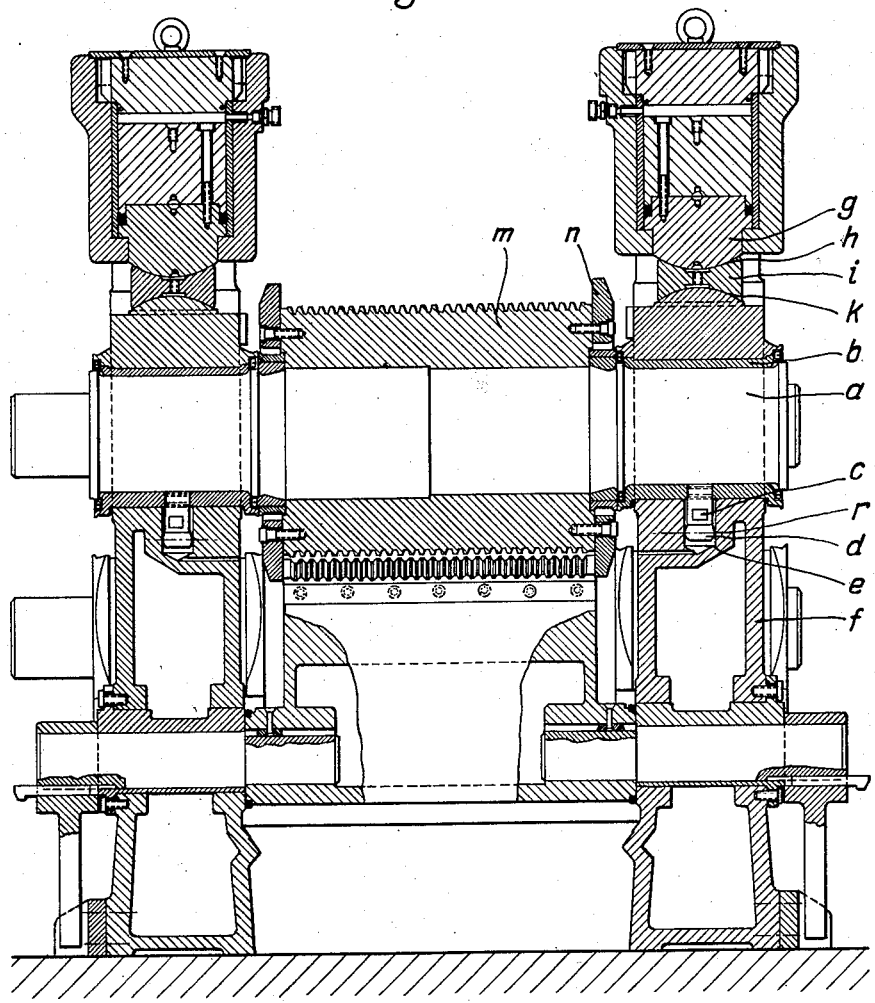

United States Patent Office 2,890,647
Patented June 16, 1959

2,890,647

ROLLER MILL BEARING

Hans Karl Busecrus, Braunschweig, Germany, assignor to Braunschweigische Maschinenbauanstalt, Braunschweig, Germany Application September 10, 1954, Serial No. 455,285

Claims priority, application Germany September 14, 1953

4 Claims. (Cl. 100—170)

The invention relates to a bearing arrangement for a roller yieldably mounted under pressure rams on roller mills, more particularly sugar-cane mills.

Roller mills are known with one or several rollers yieldably arranged under pressure rams. If these rollers are provided with a juice flange which partly covers the end face of the companion roller or rollers, the objection arises that the width of the gap between such a flange and the companion roller varies according to the inclined position of the roller. This can result on the one hand in a gap narrowing even to the extent of causing fracture of the flange and on the other hand in a widening of the gap so as to form an undesirably wide passage for the material being crushed.

An endeavour to overcome this objection by narrowly restricting the yielding stroke of the rollers in question and thus maintaining the inclination of the rollers within permissible limits, did not lead to satisfactory results. The inventor, however, has succeeded in finding a solution to the problem which represents a perfect construction.

According to the invention the pivot axis or pivotal point of such an axially guided bearing is located outside the bearing in such a manner that the bearing can swing without appreciably changing the gap between the juice flange and the counter roller or rollers.

In the case of a two-roller mill it is advisable for the pivot axis to be located in a plane at right angles to the end face of the roller and to extend through the sectors of the counter roller covered by the juice flanges.

In the case of a three-roller mill the pivot axis should preferably be located in a plane at right angles to the end face of the roller, which plane either extends through the sectors of the counter roller or rollers covered by the juice flanges or is at about a uniform distance therefrom if the said plane lies, on the one hand, over the covered sectors on the one roller and, on the other hand, under the covered sectors of the other roller. As a rule this is advisable when the mill is not symmetrically constructed, that is, when the upper roller cannot yield vertically to the connecting plane of the two lower rollers, but at an obtuse angle thereto.

An advantageous form of construction consists in that each shiftably guided bearing carries on one or several arms one or several rolling bodies located about the pivot axis and allowing a swinging movement, these bodies being provided, for example, with spherical or cylindrical surfaces.

Several embodiments of the invention are illustrated by way of example in the accompanying drawings, in which:

Fig. 6 is a similar view of a mill fitted with axially guided bearings at both ends of the roller.

Figure 1:
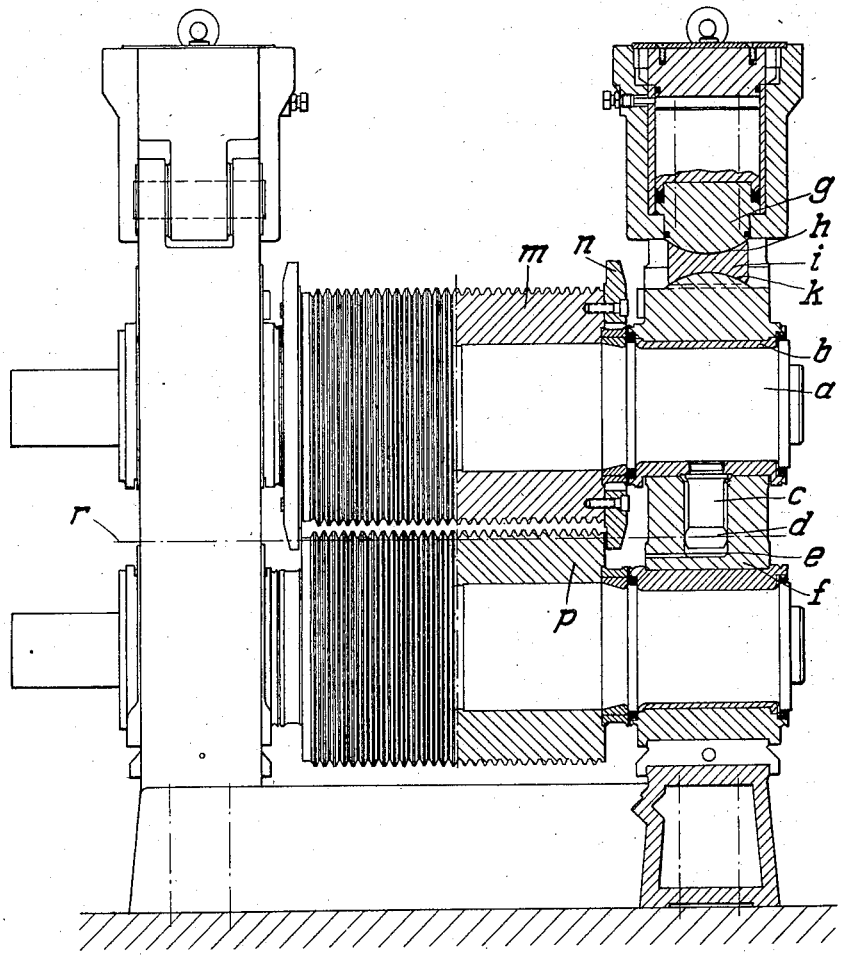
Fig. 1 is a front view showing a two-roller mill in elevation on the left side and in vertical section on the right side.

In all the figures of the drawings similar parts are designated by the same reference letters. Fig. 1 shows one end of a roller axle $a$ with its bearing $b$. This carries on its under side an arm $c$ with a spherical body $d$ which is vertically slidable and at the same time oscillatably guided in a bore $e$ in the stand $f$.

A pressure piston $g$ is slidable in the stand $f$ above the bearing $b$ and bears against a spherical surface $k$ of the bearing $b$ through the intermediary of a spherical surface $h$ and a double concave intermediate member $i$.

As can be seen from the drawing the roller $m$ carries a juice flange $n$ which overlaps a sector $o$ (Fig. 2) of the end face of the counter roller $p$.

As soon as the roller $m$ tilts under the influence of the material being crushed and the bearing $b$ assumes a correspondingly inclined position, this bearing $b$ is guided by means of arm $c$ carrying spherical body $d$ so that spherical body $d$ is guided in the bore $e$ in such a manner that the gap between the juice flange $n$ and the roller sector or edge $o$ remains practically unchanged in width.

Figure 2:
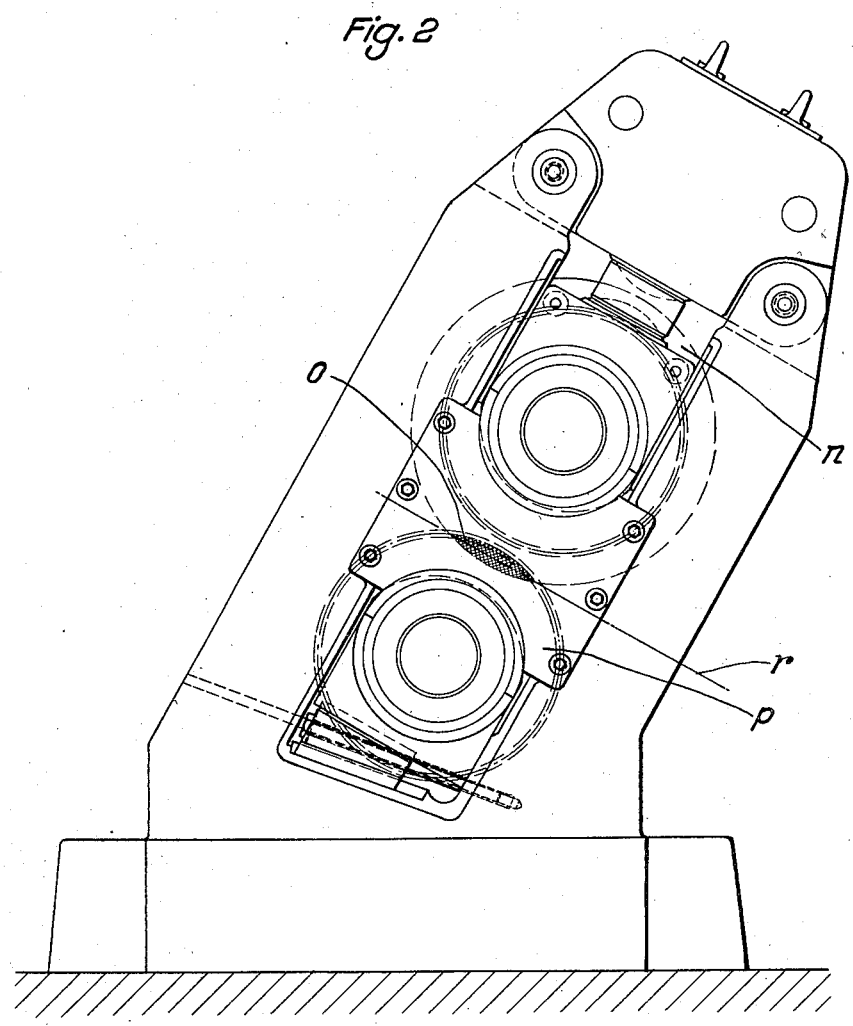
Fig. 2 is a side elevation of Fig. 1.

According to Fig. 2 a plane $r$ extends through the sector $o$ of the counter roller $p$ overlapped by the juice flange $n$, which plane is perpendicular to the end face of the rollers. The pivot axis of the slidable bearing $b$ lies in this plane and is perpendicular to the plane of the drawing of Fig. 1.

Figure 3:
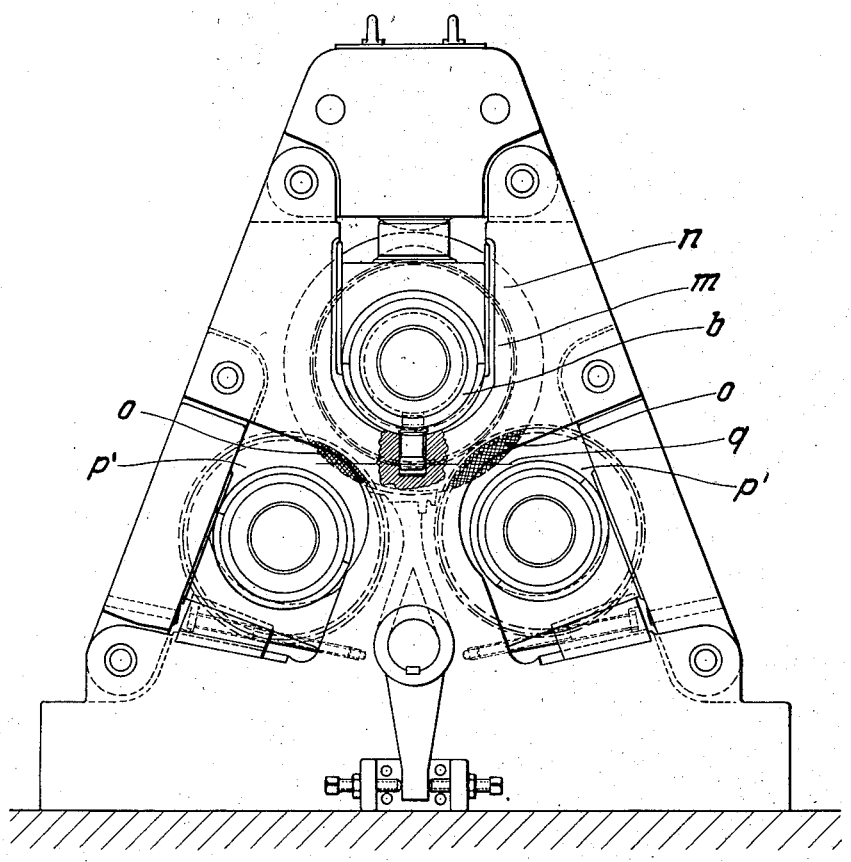
Fig. 3 shows a three-roller mill in side elevation.

In Fig. 3 the shiftable roller $m$ cooperates with two counter rollers $p'$. In this case the pivot axis of the slidable bearing $b$ lies in a plane $q$ standing perpendicular to the end face of the rollers. It extends through the sectors $o$ overlapped by the juice flanges $n$.

Figure 4:
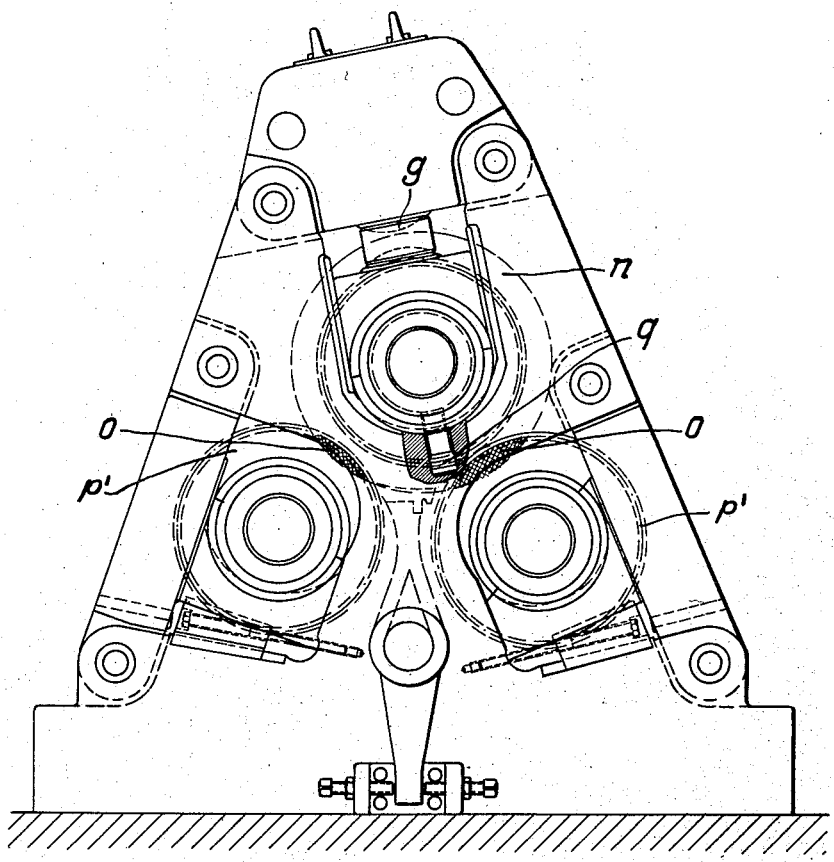
Fig. 4 is a similar view to Fig. 3 showing a three-roller mill of asymmetrical construction.

In the construction shown in Fig. 4 the pivot axis also lies in a plane $q'$ standing perpendicular to the end face of the rollers. This plane is, however, at about a uniform distance from the sectors $o'$ overlapped by the juice flanges $n$ so that it is located on one side over and on the other side under these sectors. This adjusting position is caused by the inclination of the pressure rams $g$.

The present invention comprises a pair of upstanding frames $f$, a flange roll $m$ having a pair of end flanges $n$ and being mounted for rotation on its axis in said frames $f$. A first counter-roll $p$ (Figs. 1 and 2) cooperates with the flange roll $m$ and has a sector thereof as shown by crisscross hatching $o$ (Fig. 2) located between the flanges $n$ of the flange roll $m$, the counter-roll being rotatably mounted in the frames $f$. Bearings $b$ are provided for the flange roll and at least one bearing $b$ of the flange roll $m$ can pivot about an axis lying in a first plane perpendicular to the axis of the flange roll and passing through the arm $c$ and the spherical body $d$ whereby one end of the flange roll $m$ may be moved away from the counter-roll $p$ while maintaining a substantially constant gap between the flange $n$ and the adjacent end of the counter-roll $o$. The axis of pivotal movement of the flange roll $n$ lies in said first plane which is perpendicular to the axis of roll $m$ and a second plane which is perpendicular to the first plane and such second plane passes through the sector formed by the overlapping portion of the flange $m$ and the counter-roll $p$ and through the center of spherical body $d$.

Upon reference to Figs. 3 and 4, two counter-rolls $p'$ spaced circumferentially about the flange roll $m$ each have a sector thereof between the flanges of the first roll. The pivot axis of said flange roll lies in a plane passing through said sectors to provide for the uneven raising of one end or the other end of the flange roll.

Figure 5:
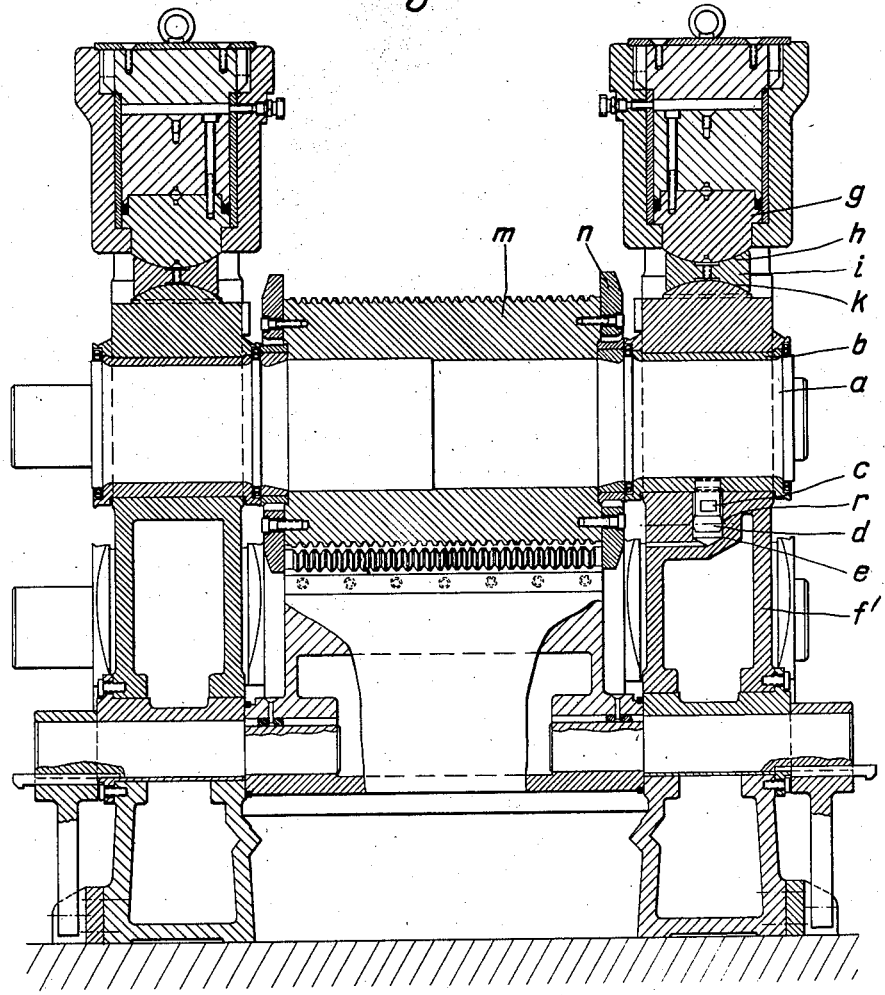
Fig. 5 is a vertical section of a mill fitted with an axially guided bearing only at one end of the roller.

If the roller mill is only equipped with the new bearing guide on one side, it will be advisable to construct the bearing provided with the guide as a stationary bearing, that is without any axial play, and the other as a loose bearing (Fig. 5). If the new bearing guide is fitted on both sides it is advisable, in order to avoid jamming, to provide both bearings with axial play at the outer side. (Fig. 6).

I claim:

1. A crusher for material of varying character comprising a pair of frames, a flange roll having a pair of end flanges mounted for rotation on its axis extending between said frames, a counter roll cooperating with said flange roll and having a sector thereof located between the flanges of said flange roll, means to rotatably mount said counter roll with said sector thereof between said frames, bearings for said flange roll, means to movably mount at least one of said bearings for said flange roll for pivotal movement about an axis lying in a first plane perpendicular to the axis of said flange roll, said axis lying in said first plane being located in a second plane parallel to said flange roll axis and passing through the sector overlapped by said flanges and said counter roll so that the flange roll may pivot away from the counter roll without substantial alteration of clearance between the flanges and the counter roll.

2. The invention according to claim 1 in which the second plane is also perpendicular to a plane containing the axes of the flange roll and the counter roll.

3. The invention according to claim 1 in which arm means are provided on said at least one bearing of said flange roll, extending generally toward said counter roll from the side of said flange roll adjacent said counter roll and engaging said frame for controlling the pivotal movement of said flange roll.

4. A crusher for material of varying character comprising a pair of frames, a flange roll having a pair of end flanges mounted for rotation on its axis extending between said frames, a first counter roll cooperating with said flange roll and having a sector thereof located between the flanges of said flange roll, means to rotatably mount said first counter roll with said sector thereof between said frames, a second counter roll cooperating with said flange roll and having a sector thereof located between the flanges of said flange roll, means to mount said second counter roll with a sector thereof between said frames, bearings for said flange roll, means to movably mount at least one of said bearings for said flange roll for pivotal movement about an axis lying in a first plane perpendicular to the axis of said flange roll, said axis lying in said first plane being located in a second plane parallel to said flange roll axis and passing through the sectors of said first and second counter rolls overlapped by said flanges and said counter rolls so that the flange roll may pivot away from the counter rolls without substantial alteration of clearance between the flanges and the counter rolls.

References Cited in the file of this patent

UNITED STATES PATENTS

| | | |
|---|---|---|
| 1,899,202 | Koepke et al. | Feb. 28, 1933 |
| 2,513,481 | Hegenbarth | July 4, 1950 |
| 2,612,101 | Bernard | Sept. 30, 1952 |